May 16, 1939.  A. MISTRETTA ET AL  2,158,244
CLUTCH PLATE
Filed Sept. 28, 1936   2 Sheets-Sheet 1
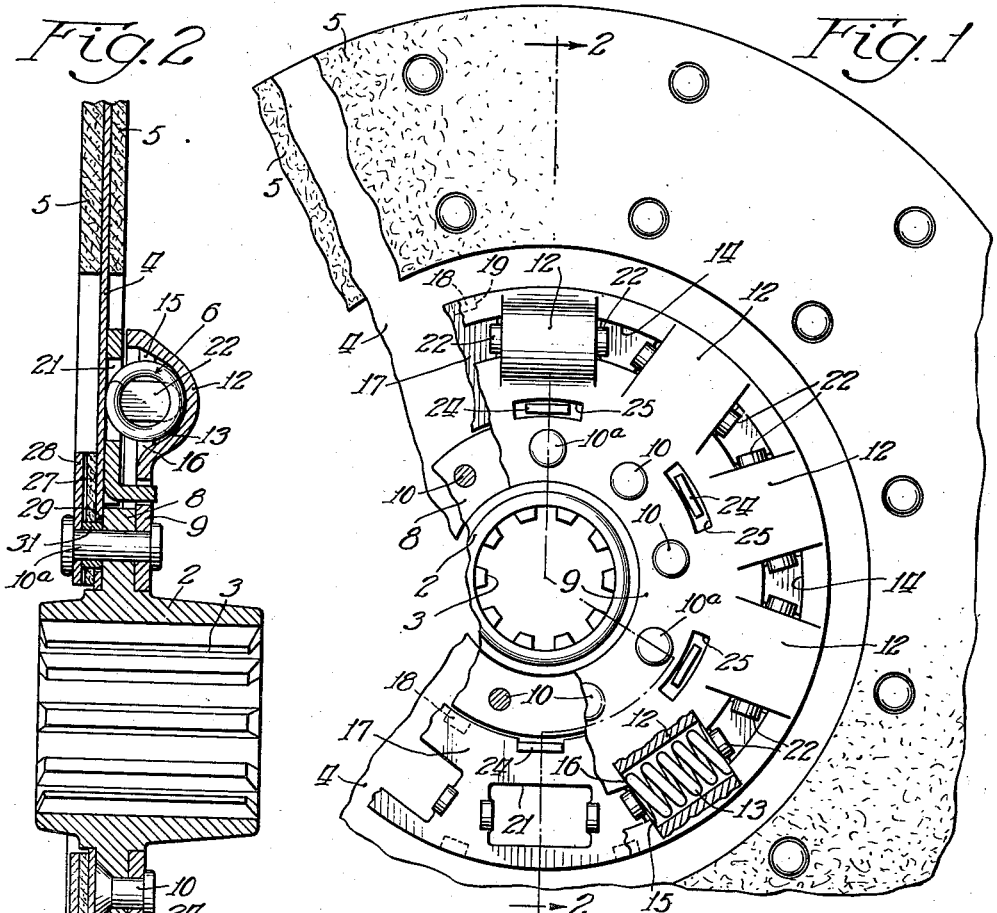
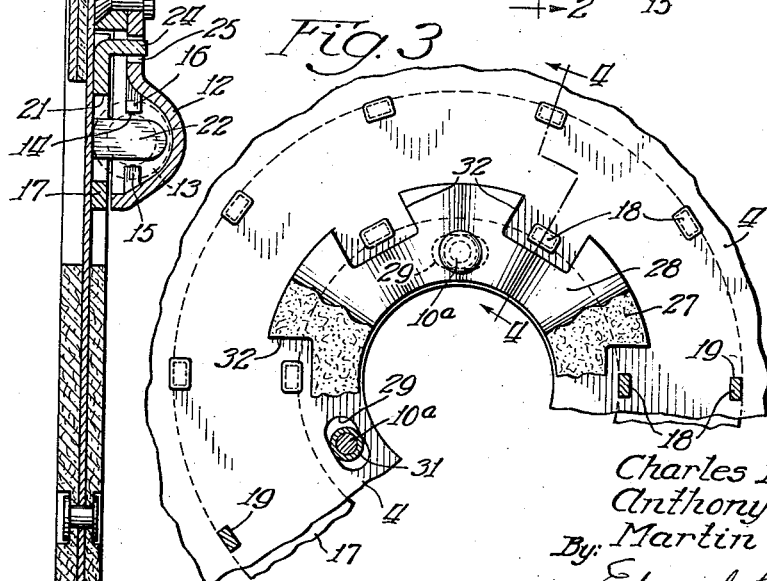
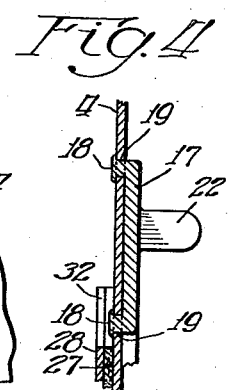
Inventors:
Charles A. Blomberg,
Anthony Mistretta,
Martin Willene.
By: Edward C. Gritzbaugh
Atty.

May 16, 1939.  A. MISTRETTA ET AL  2,158,244
CLUTCH PLATE
Filed Sept. 28, 1936  2 Sheets-Sheet 2
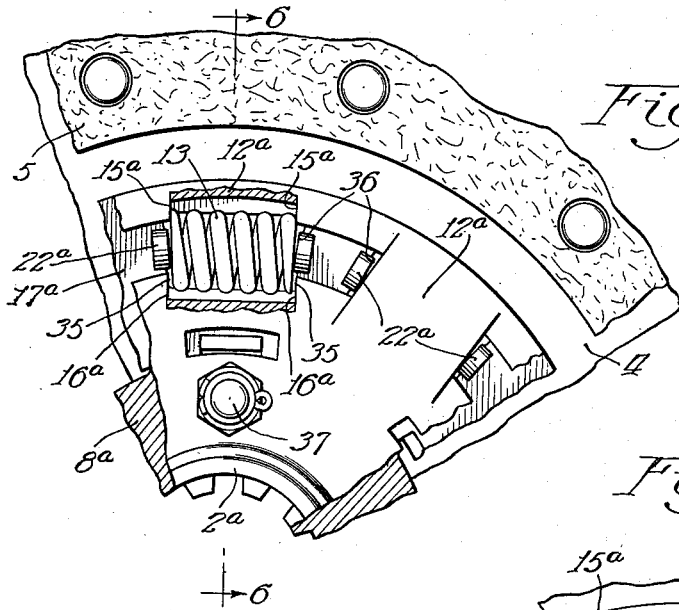
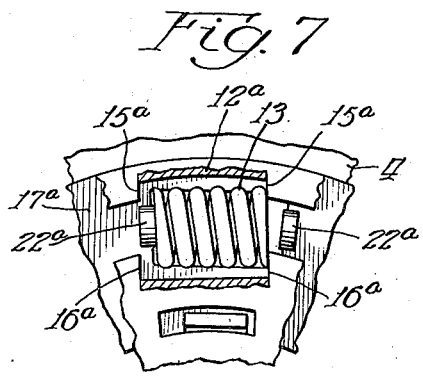
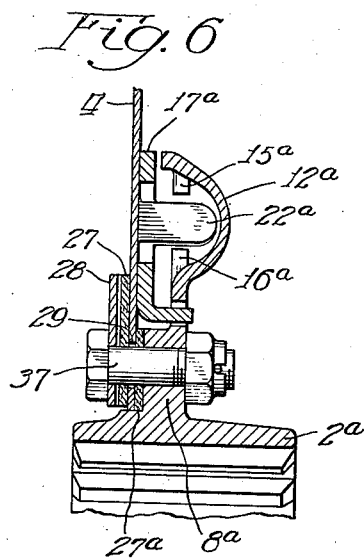
Inventors:
Charles A. Blomberg,
Anthony Mistretta,
Martin Willene.
By: Edward C. Gritzbaugh
Atty.

Patented May 16, 1939

2,158,244

UNITED STATES PATENT OFFICE 2,158,244

CLUTCH PLATE

Anthony Mistretta, Charles A. Blomberg, and Martin Willene, Rockford, Ill., assignors to Borg-Warner Corporation, Chicago, Ill., a corporation of Illinois Application September 28, 1936, Serial No. 102,858

6 Claims. (Cl. 192—68)

This invention relates to improvements in clutch plates, and more particularly to driven clutch plates incorporating a resilient cushion drive connection between the friction facing supporting assembly and the hub assembly thereof whereby to dampen torsional vibration otherwise transmitted therethrough. Such clutch plates are especially well adapted for use in motor vehicle engine clutches and in operation function to minimize noises and wear due to the transmission of torque vibration between the engine and transmission of the vehicle during operation.

It is therefore an object of our invention to provide an improved clutch plate of the character described which may operate efficiently to preclude the transmission of torsional vibration therethrough, thus to minimize noises due to vibration between the operating assemblies interconnected through the medium of the plate.

A further object is to provide an improved clutch plate as described, wherein the resilient cushion drive connection is in the form of an annular array of compression springs, and wherein the springs are so mounted and arranged relative to the facing supporting assembly and the hub assembly as to prevent positively dislocation thereof, and in the event of breakage, to preclude the displacements of the broken spring parts into the engine clutch casing.

Another object is to provide an improved clutch plate as described wherein the entire resilient cushion drive assembly is located upon the transmission side of the plate, thus to enable disposition of the plate in close proximity to the flywheel of the engine which may form one element of the clutch driving assembly.

Another object is to provide an improved clutch plate as described wherein the points of engagement of the facing supporting assembly and the hub assembly with the cushion springs are such as to cause the springs to compress in a reasonably straight line each along its longitudinal axis, thereby to reduce spring fatigue as through arcing compression.

Other objects, the advantages and uses of the invention will be apparent after reading the following specification and claims, and after consideration of the drawings forming a part of the specification wherein:

Fig. 1 is a fragmentary rear elevation of a clutch plate constructed in accordance with our invention;

Fig. 2 is a sectional view along the line 2—2 of Fig. 1;

Fig. 3 is a fragmentary front elevation of the clutch plate illustrated in Fig. 1;

Fig. 4 is a sectional view along the line 4—4 of Fig. 3;

Fig. 5 is a view similar to Fig. 1 of a modified form of the clutch plate;

Fig. 6 is a sectional view along the line 6—6 of Fig. 5; and

Fig. 7 is a view of the structure shown in Fig. 5 during the transmission of torque therethrough.

We have selected for illustration herein a driven clutch plate of the type constructed for use in motor vehicle engine clutches, although it will be understood that our invention may be applicable to clutch plates for the clutches of stationary power drive assemblies with equal success in operation.

With reference to Figs. 1 and 2, our improved clutch plate may comprise a hub member 2 internally splined, as indicated at 3, for driving engagement with the complementary splined shaft of the motor vehicle transmission. A sheet metal disc 4 is mounted concentrically of the hub member 2, having friction facings 5 on opposite sides of its peripheral portion adapted frictionally to be engaged by a clutch driving assembly, and a resilient cushion drive assembly, generally indicated at 6, forming a cushion drive connection between the disc 4 and hub 2, whereby to dampen torsional vibration otherwise transmitted through the plate.

The hub 2 may be formed with an integral and radially extending flange 8 in its outer wall in overlapping engagement with the inner portion of the disc 4. A rigid side plate 9 overlapping the opposite side of the flange 8 and fixed thereto, as by means of rivets 10, serves as a partial housing and support for the torsional dampener mechanism 6. The plate 9 is formed by stamping to provide in its outer region a plurality of semi-cylindrical depressions 12 arranged with the axes thereof in circumferential alignment about the plate, each depression serving partially to receive a compression spring 13 (see Fig. 2).

In the clutch plate shown we have illustrated ten such compression springs each partially received within a depression 12. Portions of the plate 9 between the depressed portions 12 are sheared away, as indicated at 14, thus to provide shoulders 15 and 16 at opposite ends of the depressions against which opposite ends of the springs 13 may seat. It will be noted that the shoulders 15 and 16 each extend toward the center of the spring from diametrically opposite sides thereof, but do not extend entirely across the spring. This arrangement is attained by making the width of the cut away portions 14 slightly less than the diameter of the semi-cylindrical depressions 12.

The convex side of the depressed portions 12 extends (see Fig. 2) away from the disc 4, thereby to confine the springs 6 between the plate and the disc assembly. An annular member 17 is secured to the disc 4 on that side of the disc facing the plate 9, by means of a plurality of integral rivet portions 18 insertable through openings 19 in the disc 4 and swedged in place thereon, as indicated in Fig. 4. The member 17 has a plurality of openings 21 therethrough, one in registration with each of the depressed portions 12 of the plate 9, and has formed at the opposite ends of each of the openings 21, laterally extending lugs 22. The lugs 22 are so arranged as to extend diametrically across and engage with the opposite ends of each of the springs 13 along an axis perpendicular to the longitudinal axis of the aligned shoulders 15 and 16, thus to provide seats for the springs 13 associated with the disc 4.

Means for limiting relative rotation between the hub assembly 2 and the disc 4 may be established through the medium of laterally extending stop portions 24 formed on the member 17 and each projecting through an arcuate opening 25 in the plate 9. This arrangement permits of a limited relative rotation between the disc assembly against the compression of the springs 13, but provides for positive driving connection therebetween in the event the springs have become compressed in either direction beyond a limit predetermined by the relationship between the stops 24 and the ends of the openings 25.

Friction means to prevent oscillation or "hunting" between the disc 4 and hub 2 during operation of the plate may comprise an annular friction disc 27 interposed between the disc 4 and a spring metal disc 28 on the engine side of the disc 4, and to the left thereof as viewed in Fig. 2. If desired, the disc 28 may be wavy in form, as shown, so that when under compression it will bear yieldingly upon the friction disc 27. The plate 28 and friction disc 27 may be held in place by the rivets 10a, extending through the entire overlapping portions of the disc and hub assembly, elongated openings 29 being formed through the disc 4 to permit relative rotation between the disc and rivets 10a (see Fig. 3).

We prefer to employ a spacer sleeve 31, one surrounding each of the rivets 10a to limit the compression of the friction disc 27. The disc 27 may be constructed of any suitable friction material, preferably such as that used for clutch facings. As shown in Fig. 3, recesses 32 may be cut into the periphery of the disc 27 and plate 28 to clear the exposed and swedged ends of the rivet portions 18 of the member 17.

In operation our improved clutch plate permits of relative rotation between the disc 4 and driven hub assembly through a limited arc represented by the stops 24 and openings 25. Relative rotation of the disc 4 and hub 2 in either direction from that position indicated in Fig. 1 is of course resisted by the yielding compression springs 13, thus to establish a resilient cushion drive between the disc and hub, and because of such drive, to minimize the transmission of torsional vibration therebetween. Compression of the springs 13 in either direction, depending upon the direction of relative rotation between the disc 4 and hub 2, will be substantially along a straight line by virtue of the novel arrangement afforded by the disposition of the lugs 22 and shoulders 15 and 16 along perpendicular axes, each intersecting the center of the springs. This feature of our improved clutch plate discourages the arcing of the springs during compression which is so prevalent in clutch plate torsional dampener constructions heretofore provided.

Oscillation of the disc relative to the hub 2 of the character commonly referred to as "hunting" will be minimized by the disposition of the friction disc 27 tending always to dampen oscillation permitted by the yielding drive connection through the springs 13.

In the event of breakage of the springs 13 during operation, the broken portions thereof may continue in part to function as cushion springs, since the construction herein described so completely confines the springs within their cooperating enclosure members as to prevent dislocation of the springs or broken portions thereof. It will be noted also that the entire cushion drive connection may be located on that side of the plate opposite to the engine flywheel or engine side of the clutch, thus to simplify adaptation of the plate to the flywheel where one face of the flywheel is employed as a clutch driving member in a manner well known in the art.

While we have illustrated in Figs. 1 to 4 inclusive, and described in detail one specific embodiment of our invention, it will be understood that many modifications thereof may be evolved without departing from the spirit and scope of the invention, such for example, as we have illustrated in Figs. 5 to 7 inclusive.

In Fig. 5 we have illustrated a modified arrangement of mounting for the springs 13. This arrangement contemplates the disposition of the opposed spring seat-forming shoulders 16a at a greater distance apart from one another than are the shoulders 15a, and in positioning the lugs 22a so that they contact the spring 13 at the inner edges of the lugs, as shown. This arrangement leaves the shoulders 16a out of contact with the springs 13, and the outer edges of the lugs 22a out of contact with the springs when the hub and disc assemblies of the plate are at rest relative to one another, or in so-called "neutral" position. During the transmission of torque through the spring 13 from disc assembly to hub assembly, the parts assume the position shown in Fig. 7, with one of each of the opposed pairs of shoulders 15a and 16a in engagement with the springs, and one of the lugs 22a in full engagement with the springs. One of the advantages attributable to this modified arrangement of spring mounting is the elimination of noises which might otherwise occur after the plate had been in operation for some time, with the result that the shoulders 15 and 16 and lugs 22, as viewed in Fig. 1, would be thus out of full engagement with the springs, as through wear. Under such a condition, slight relative oscillation between disc and hub assemblies might give rise to objectionable noise.

With reference to Fig. 6, it will be noted that in this form of the clutch plate we have constructed the hub flange 8a so as to include that portion of the hub assembly having the spring-receiving depressions 12a. Such construction might be carried out through forging the hub assembly with subsequent finish of the outer flanged portion to provide the shoulders 15a and 16a as described. We have also illustrated in Fig. 6, two of the friction discs including those shown and described in connection with the plate shown in Fig. 1, and a second disc 27a. The disc 27a may be located between the facing supporting disc 4 and the adjacent face of the hub flange 8a. In place of the rivets 10a, we have illustrated bolt and nut assemblies 37 by means of which the compression of the friction discs 27 and 27a on opposite sides of the disc 4, may be adjusted at will.

We claim:

1. A clutch plate comprising, a hub member, a friction facing supporting disc of relatively thin sheet metal mounted concentrically of said hub member and adapted to oscillate relative thereto, a plurality of cylindrical compression springs arranged with their axes in annular array about the axis of said hub, means carried by said disc providing seats for diametrically opposed portions of both ends of each of said springs, and rigid means carried by said hub member providing seats for diametrically opposed portions of both ends of each of said springs, said last named seats being located, with respect to the ends of said springs, substantially 90 degrees from said first named seats.

2. A clutch plate comprising, a hub member, a friction facing supporting disc mounted concentrically of said hub member and adapted to oscillate relative thereto, a plurality of cylindrical compression springs arranged with their axes in annular array about the axis of said hub, means carried by said disc engaging both ends of each of said springs, and means carried by said hub member engaging both ends of each of said springs, said spring engaging means being particularly characterized by the fact that each of said engaging means engages the spring with which it cooperates along at least two diametrically opposed points on spring diameters which intersect at the mid point of the springs, whereby to effect compression along the axes of said springs without changing said axes and thus eliminating objectional distortion effects in said springs and in the metal of said disc.

3. A clutch plate, as described, comprising, a hub member having a radial flange, a sheet metal disc member mounted concentrically of said hub and overlapping one side of said flange, a side plate mounted on said flange at the opposite side thereof, said side plate having a plurality of depressions formed in that portion thereof facing said disc and being further formed to provide spring seats, a plurality of compression springs partially received in said depressions with their opposed ends each engaging a pair of said seats disposed along a diameter of said springs, and means fixed to said disc between said side plate and said disc providing laterally engaging lugs engageable with opposite ends of each of said springs at at least two points on a diameter of said springs and extending diametrically across the ends of said springs, said seats on said side plate and on said lugs engaging respectively with diameters on said springs which intersect at substantially the mid point of said springs, whereby to eliminate distortion of the axes of said springs and distortion of said sheet metal disc.

4. A clutch plate as defined in claim 3, including positive stop means associated with said means and with said side plate, whereby to limit relative rotation of the disc and the hub.

5. A clutch plate comprising, a hub member, a friction facing supporting disc mounted concentrically of said hub member and adapted to oscillate relative thereto, a plurality of substantially cylindrical compression springs arranged with their axes in annular array about the axis of said hub, means carried by the disc engaging both ends of each of said springs, and means carried by said hub member engaging both ends of each of said springs, the points of engagement between said first named means and said springs being along diameters of said springs, and the points of engagement between said second named means and said springs being along other diameters of said springs which intersect said first named diameters of said springs at substantially the central axes of said springs.

6. A clutch plate comprising, a hub assembly, a friction facing supporting disc mounted concentrically of said hub assembly and adapted to oscillate relative thereto, a plurality of compression springs arranged with their central axes in annular array about the axis of said hub assembly, means carried by said disc engaging both ends of each of said springs, and means carried by said hub assembly engaging both ends of each of said springs, the points of engagement between each of said means and said springs being along diameters of said springs and for a distance along each side of each of said diameters.

ANTHONY MISTRETTA.
CHARLES A. BLOMBERG.
MARTIN WILLENE.